(12) United States Patent
Kinila et al.

(10) Patent No.: US 11,766,989 B1
(45) Date of Patent: Sep. 26, 2023

(54) COLLAPSIBLE HOOD BUMPER BRACKET

(71) Applicant: GM GLOBAL TECHNOLOGY OPERATIONS LLC, Detroit, MI (US)

(72) Inventors: Vivekananda Kinila, Karnataka (IN); Anandakumar Marappan, Karnataka (IN); Vikram S. Patil, Karnataka (IN)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 17/746,140

(22) Filed: May 17, 2022

(51) Int. Cl.
*B60R 21/34* (2011.01)
*B62D 25/12* (2006.01)

(52) U.S. Cl.
CPC .............. *B60R 21/34* (2013.01); *B62D 25/12* (2013.01)

(58) Field of Classification Search
CPC ... B60R 21/34; B60R 2021/343; B60R 21/38; B62D 25/12; B62D 25/163
USPC ........................................................ 180/274
See application file for complete search history.

(56) References Cited

U.S. PATENT DOCUMENTS

| | | | | |
|---|---|---|---|---|
| 8,991,537 B2* | 3/2015 | Snede | ...................... | E05F 5/022 |
| | | | | 180/69.2 |
| 9,656,627 B2* | 5/2017 | Gardynik | ................ | B62D 25/12 |
| 10,150,444 B1* | 12/2018 | Schwalm | ................... | E05F 5/02 |
| 10,287,813 B2* | 5/2019 | Kolar | .................... | B62D 25/105 |
| 2006/0064845 A1* | 3/2006 | Fujii | ....................... | B60R 21/34 |
| | | | | 16/82 |
| 2008/0290692 A1* | 11/2008 | Boggess | .................. | B60R 21/34 |
| | | | | 296/187.09 |
| 2019/0055769 A1* | 2/2019 | Davis | ..................... | B62D 25/12 |

FOREIGN PATENT DOCUMENTS

| | | | | |
|---|---|---|---|---|
| CN | 203819360 U | * | 9/2014 | |
| CN | 204161476 U | * | 2/2015 | ............ B62D 25/02 |
| KR | 100471472 B1 | * | 12/2002 | |
| KR | 20040048076 A | * | 6/2004 | |
| KR | 100471477 B1 | * | 3/2005 | |

OTHER PUBLICATIONS

KR 100471472 B1 Park, English translation received Feb. 9, 2023, published Mar. 9, 2005 (Year: 2005).*

* cited by examiner

*Primary Examiner* — Drew J Brown
*Assistant Examiner* — Caitlin Anne Miller
(74) *Attorney, Agent, or Firm* — CANTOR COLBURN LLP

(57) ABSTRACT

A hood and bumper assembly of a vehicle includes a hood assembly, and a hinge about which the hood assembly rotates between an open position and a closed position. A bumper bracket is secured to a fixed support of the vehicle, and a bumper is located between the bumper bracket and the hood assembly to absorb an impact force of the hood assembly. The bumper bracket is configured to release from the fixed support when the impact force exceeds a preselected threshold to dissipate the impact force. A bumper assembly for a hood of a vehicle includes a bumper bracket secured to a fixed support of the vehicle, and a bumper positioned between the bumper bracket and the hood to absorb an impact force. The bumper bracket is configured to release from the fixed support when the impact force exceeds a preselected threshold to dissipate the impact force.

16 Claims, 5 Drawing Sheets

COLLAPSIBLE HOOD BUMPER BRACKET

INTRODUCTION

The subject disclosure relates to vehicles, and in particular to hood systems of vehicles. Hood systems of vehicles are required to meet requirements to absorb forces in the event a pedestrian impacts the hood of the vehicle to prevent injury to the pedestrian. Further, while meeting the above requirements it is also desired to reduce damage to the vehicle structure in the event of such an impact. Vehicle hood systems typically utilize hood bumpers on which the vehicle hood is closed, which are mounted to body components of the vehicle. Such bumpers may not be optimal in absorbing or dissipating the impact forces on the hood assembly.

SUMMARY

In one embodiment, a hood and bumper assembly of a vehicle includes a hood assembly, and a hinge about which the hood assembly rotates between an open position and a closed position. A bumper bracket is secured to a fixed support of the vehicle, and a bumper is located between the bumper bracket and the hood assembly to absorb an impact force of the hood assembly. The bumper bracket is configured to release from the fixed support when the impact force exceeds a preselected threshold to dissipate the impact force.

Additionally or alternatively, in this or other embodiments the bumper bracket includes one or more bracket slots defined in the bumper bracket and a bracket sleeve located in each bracket slot of the one or more bracket slots. A stud secured to the fixed support that extends through each bracket sleeve and is secured therein. The bracket sleeve is configured to deform and release the stud when the impact force exceeds the preselected threshold.

Additionally or alternatively, in this or other embodiments the bracket sleeve includes a U-shaped cross-section through which the stud extends, and the stud includes a complimentary rectangular portion that is installed into the U-shaped cross-section of the bracket sleeve.

Additionally or alternatively, in this or other embodiments the U-shaped cross-section of the bracket sleeve includes one or more deformable flanges configured to deform and release the stud when the impact force exceeds the preselected threshold.

Additionally or alternatively, in this or other embodiments the bracket sleeve is secured in the bracket slot via welding.

Additionally or alternatively, in this or other embodiments a nut is installed to a tip end of the stud, with the bracket sleeve located between the fixed support and the nut.

Additionally or alternatively, in this or other embodiments the bracket moves in a path defined by the one or more bracket slots upon release of the stud therefrom.

Additionally or alternatively, in this or other embodiments the bumper bracket is L-shaped.

Additionally or alternatively, in this or other embodiments the bumper is located at a first bumper bracket surface and the one or more bracket slots are located at a second bumper bracket surface.

In another embodiment, a bumper assembly for a hood of a vehicle includes a bumper bracket secured to a fixed support of the vehicle, and a bumper positioned between the bumper bracket and the hood to absorb an impact force. The bumper bracket is configured to release from the fixed support when the impact force exceeds a preselected threshold to dissipate the impact force.

Additionally or alternatively, in this or other embodiments the bumper bracket includes one or more bracket slots defined in the bumper bracket, and a bracket sleeve located in each bracket slot of the one or more bracket slots. A stud is secured to the fixed support and extending through each bracket sleeve and is secured therein. The bracket sleeve is configured to deform and release the stud when the impact force exceeds the preselected threshold.

Additionally or alternatively, in this or other embodiments the bracket sleeve includes a U-shaped cross-section through which the stud extends, and the stud includes a complimentary rectangular portion that is installed into the U-shaped cross-section of the bracket sleeve.

Additionally or alternatively, in this or other embodiments the U-shaped cross-section of the bracket sleeve includes one or more deformable flanges configured to deform and release the stud when the impact force exceeds the preselected threshold.

Additionally or alternatively, in this or other embodiments the bracket sleeve is secured in the bracket slot via welding.

Additionally or alternatively, in this or other embodiments a nut installed to a tip end of the stud, with the bracket sleeve located between the fixed support and the nut.

Additionally or alternatively, in this or other embodiments the bracket moves in a path defined by the one or more bracket slots upon release of the stud from the bracket sleeve.

Additionally or alternatively, in this or other embodiments the bumper bracket is L-shaped.

Additionally or alternatively, in this or other embodiments the bumper is located at a first bumper bracket surface and the one or more bracket slots are located at a second bumper bracket surface.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

Figure 1:
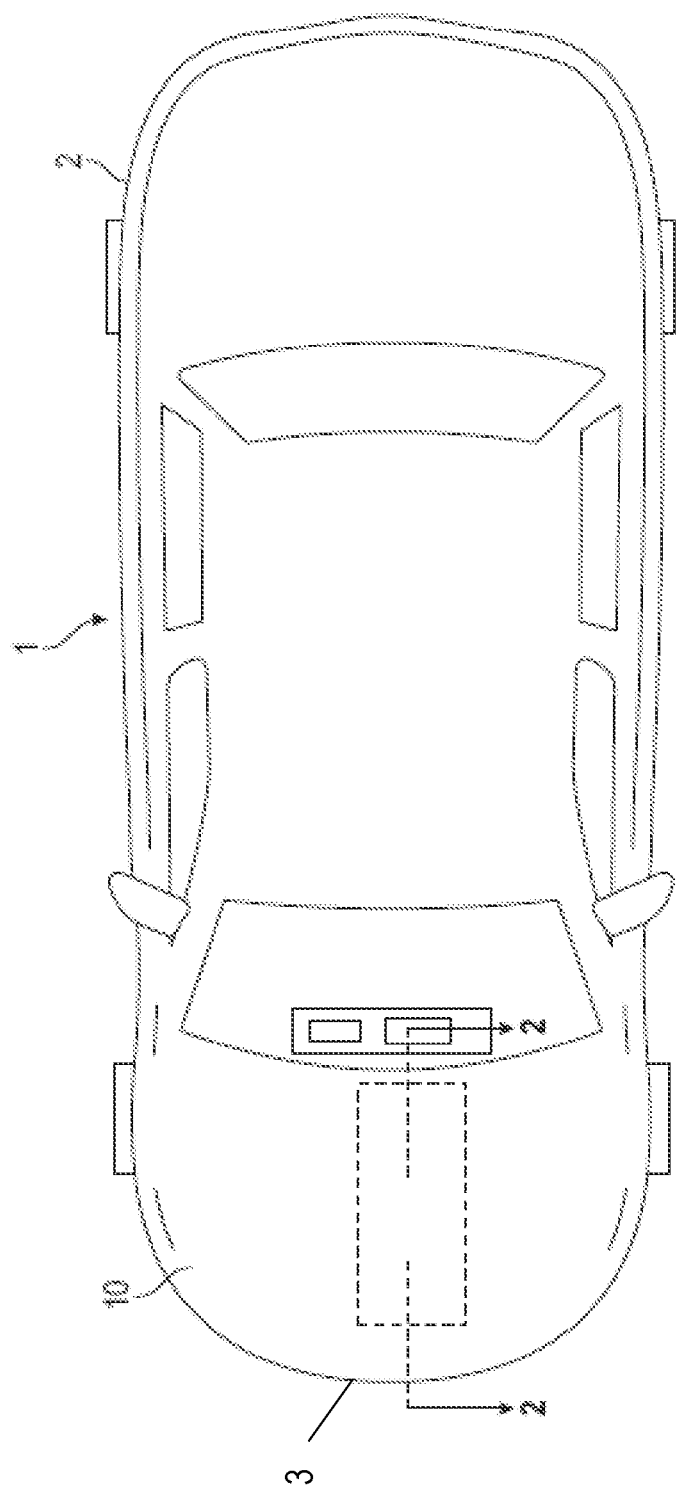
FIG. 1 is an illustration of an embodiment of a vehicle.

The following description is merely exemplary in nature and is not intended to limit the present disclosure, its application or uses. It should be understood that throughout the drawings, corresponding reference numerals indicate like or corresponding parts and features.

In accordance with an exemplary embodiment, a plan view of an embodiment of a vehicle 1 is illustrated in FIG. 1. The vehicle 1 includes a vehicle body 2, which includes a hood assembly 10 that in some embodiments is located generally at a front end 3 of the vehicle body 2.

Figure 2:
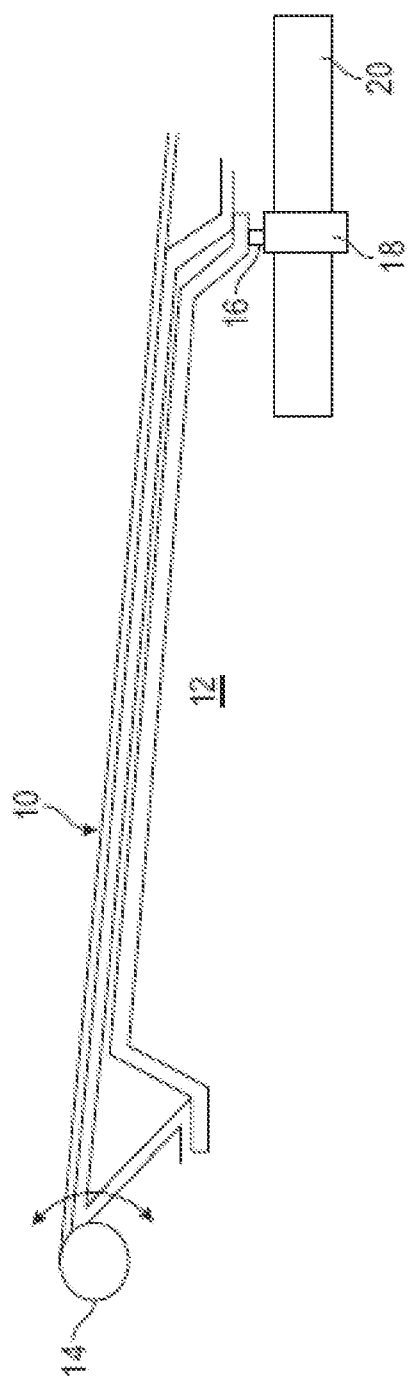
FIG. 2 is a sectional view of an embodiment of a hood assembly of the vehicle of FIG. 1 taken at 2-2.

Referring now to FIG. 2, a partial cross-sectional view of the hood assembly 10 is illustrated. The hood assembly 10 encloses an under hood area 12 of the vehicle body 2, which may contain, for example, an engine and/or other propulsion system components of the vehicle. The hood assembly 10 is movable between an open position and a closed position by moving the hood assembly 10 on one or more hinges 14.

Figure 3:
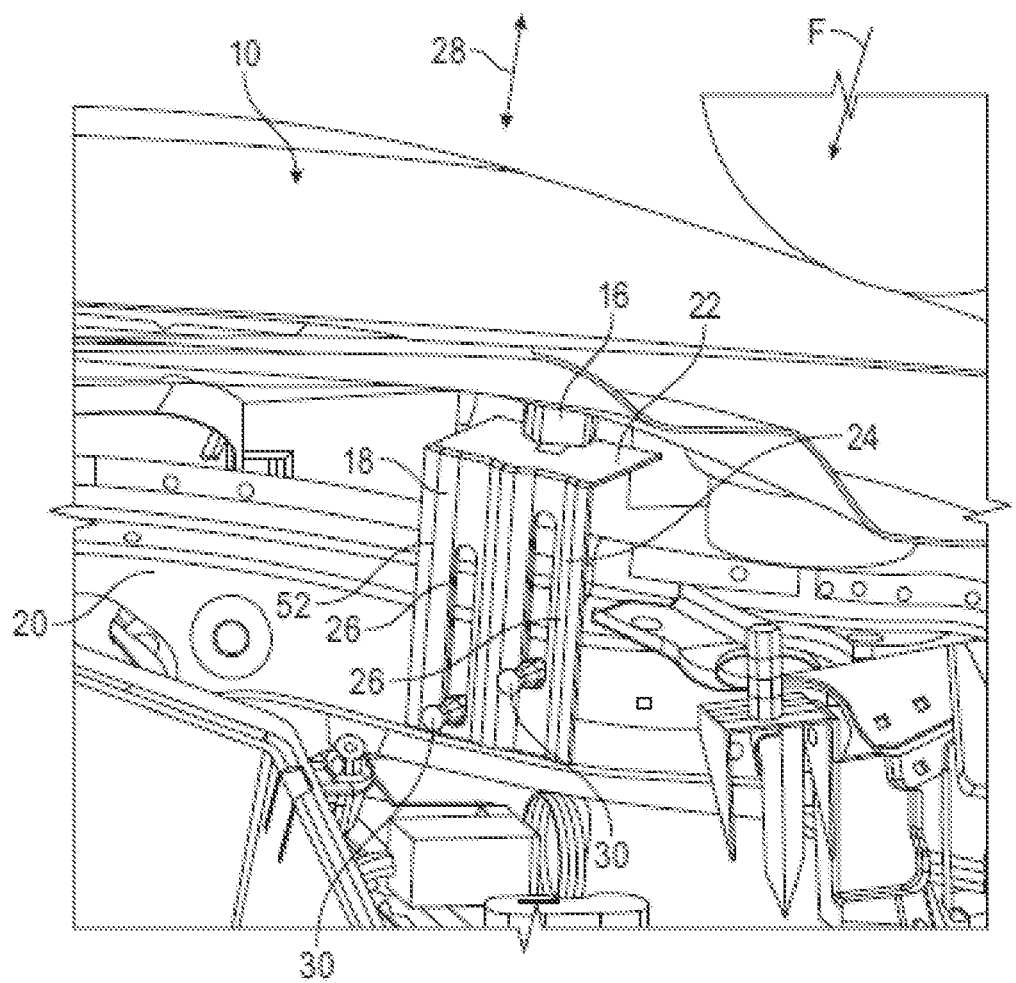
FIG. 3 is a perspective view of an embodiment of a bumper configuration for a hood assembly.

Referring to FIG. 3, when the hood assembly 10 is in the closed position, the hood assembly 10 rests on one or more bumpers 16, which are formed from, for example, a rubber, foam or elastomeric material. The bumper 16 is secured to and supported by a bumper bracket assembly 52 having a bumper bracket 18, which in turn is secured to a stationary body component, such as a support frame 20 of the vehicle body 2. In some embodiments, the bumper bracket 18 is L-shaped, with the bumper 16 located at a first bracket leg 22, and the bumper bracket assembly 52 is secured to the support frame 20 via a second bracket leg 24. One skilled in the art will readily appreciate that the shape of the bumper bracket 18 described is merely exemplary, and that other shapes of bumper brackets 18 may be utilized. The second bracket leg 24 includes one or more bracket slots 26, that extend along a vertical direction 28, or a direction that the hood assembly 10 closes on the bumper 16. A stud 30 extends from the support frame 20 and through a corresponding bracket slot 26 of the one or more bracket slots 26. The stud 30 is secured to the support frame 20 by, for example, welding.

Figure 4:
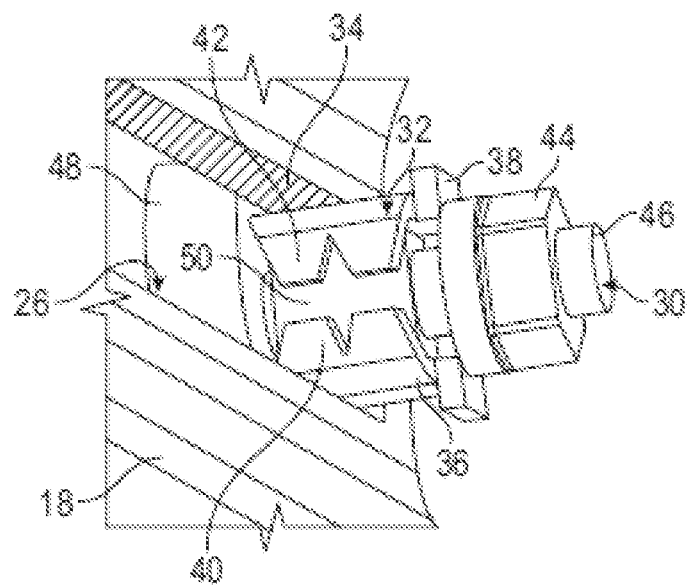
FIG. 4 is a perspective view of an embodiment of a bumper bracket and stud configuration for a hood assembly.
Figure 5:
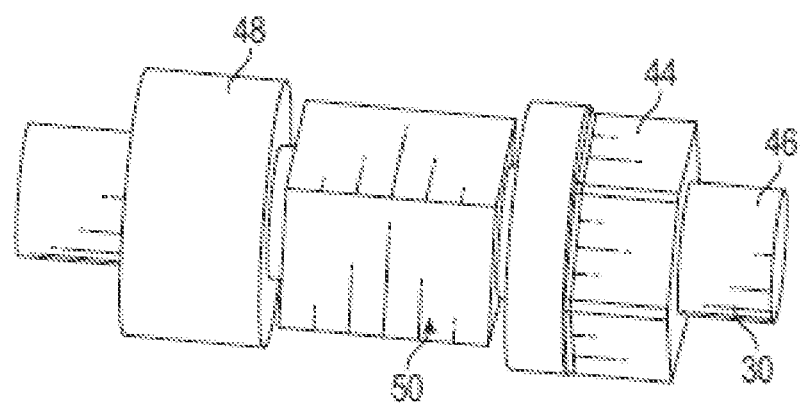
FIG. 5 is a perspective view of an embodiment of a stud for a hood assembly.

Referring now to FIG. 4, a sleeve 32 is located in an interior of the bracket slot 26 by, for example, MiG welding. The sleeve 32 has a U-shaped portion 36 located in the bracket slot 26 and an end flange portion 38 located outside of the bracket slot 26. As shown in FIG. 4, the U-shaped portion 36 has an open cross-section having a first flange 40 and a second flange 42. The stud 30 is installed through the sleeve 32 and a nut 44 is installed onto a tip portion 46 of the stud 30. While a nut 44 is illustrated in FIG. 4 and described herein, alternatively the stud 30 may be secured in the sleeve 32 by other means such as, for example, crimping the tip portion 46 of the stud 30 after installation of the stud 30 through the sleeve 32. The stud 30 includes a shaft portion 50 extending to the tip portion 46, and a washer 48 is installed between the support frame 20 and the bumper bracket 18. The shaft portion 50 has a rectangular cross-section, as shown in FIG. 5, that matches the U-shaped portion 36 of the sleeve 32. Referring again to FIG. 4, when the stud 30 is installed into the sleeve 32, the rectangular cross-section of the shaft portion 50 is disposed in the U-shaped portion 36 of the sleeve 32, and rotation of the stud 30 relative to the sleeve 32 is thereby prevented.

Figure 6:
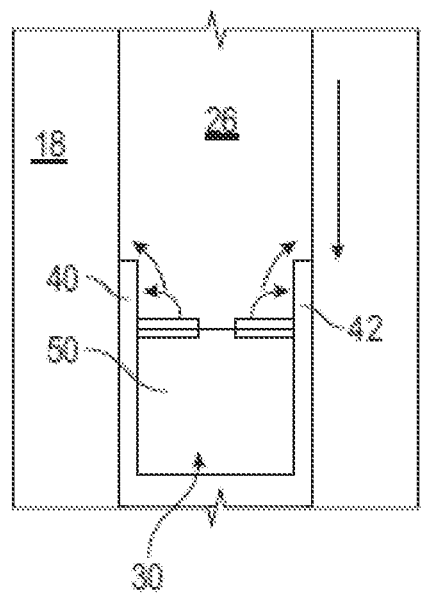
FIG. 6 is a schematic illustration of operation of a bumper bracket and stud configuration for a hood assembly.
Figure 7:
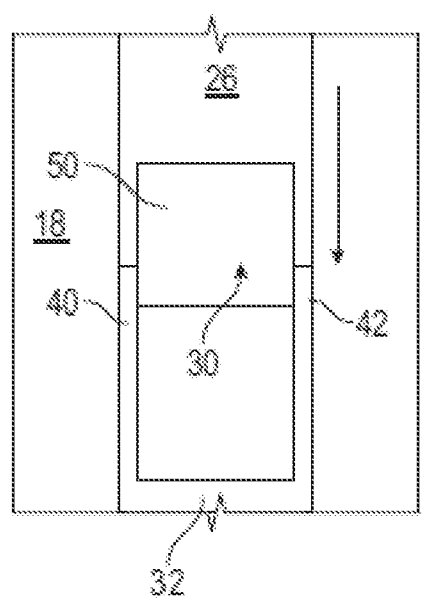
FIG. 7 is another schematic illustration of operation of a bumper bracket and stud configuration for a hood assembly.

Referring again to FIG. 3, in some operating conditions of the vehicle, an impact force F is imparted on the hood assembly 10 and, as will now be described, the impact force F is dissipated via the bumper bracket 18. When a sufficient impact force F in imparted on the hood assembly 10, the force is transmitted through the bumper 16 and into the bumper bracket 18. As illustrated in FIG. 6, the force causes the first flange 40 and the second flange 42 to deflect and release the shaft portion 50 of the stud 30, and the nut 44 moves with the stud 30 off the end flange portion 38 of the sleeve 32. This allows the bumper bracket 18 to move vertically downwardly relative to the stud 30 as shown in FIG. 7, along a path defined by the bracket slot 26. This movement of the bumper bracket 18 allows similar downward movement of the hood assembly 10, thus dissipating the impact force F.

The bumper bracket 18 may be stiffened via use of a high grade material or with gauge increase since it is not expected to deform during head impact rather than the entire bumper bracket assembly 52 is made to collapse. The impact force at which the flanges 40, 42 fail or deform can be tuned by varying an area of engagement between the stud 30 and the sleeve 32 by changing a size or shape of the flanges 40, 42 or a thickness of the flanges 40, 42. Additionally, the impact force at which the flanges 40, 42 fail or deform can also be tuned by varying an area of engagement between the flange portion 38 and the nut 44 by changing a size or shape of the flange 38 and/or a diameter of the nut 44. Further, a tightening torque of the nut 44 onto the stud 30 may be varied to tune the impact force at which the flanges 40, 42 will deform or fail. This tunability increases flexibility of using this configuration across vehicle programs and/or under different impact force requirements.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. A hood and bumper assembly of a vehicle, comprising:
   a hood assembly;
   a hinge about which the hood assembly rotates between an open position and a closed position;
   a bumper bracket secured to a fixed support of the vehicle; and
   a bumper disposed between the bumper bracket and the hood assembly to absorb an impact force of the hood assembly;
   wherein the bumper bracket is configured to release from the fixed support when the impact force exceeds a preselected threshold to dissipate the impact force;
   wherein the bumper bracket includes:
     one or more bracket slots defined in the bumper bracket; and
     a bracket sleeve disposed in each bracket slot of the one or more bracket slots; and
     a stud secured to the fixed support that extends through each bracket sleeve and is secured therein;
   wherein the bracket sleeve is configured to deform and release the stud when the impact force exceeds the preselected threshold.

2. The hood and bumper assembly of claim 1, wherein:
   the bracket sleeve includes a U-shaped cross-section through which the stud extends; and
   the stud includes a complimentary rectangular portion that is installed into the U-shaped cross-section of the bracket sleeve.

3. The hood and bumper assembly of claim 2, wherein the U-shaped cross-section of the bracket sleeve includes one or more deformable flanges configured to deform and release the stud when the impact force exceeds the preselected threshold.

4. The hood and bumper assembly of claim 1, wherein the bracket sleeve is secured in the bracket slot via welding.

5. The hood and bumper assembly of claim 1, further comprising a nut installed to a tip end of the stud, with the bracket sleeve disposed between the fixed support and the nut.

6. The hood and bumper assembly of claim 1, wherein the bracket moves in a path defined by the one or more bracket slots upon release of the stud therefrom.

7. The hood and bumper assembly of claim 1, wherein the bumper bracket is L-shaped.

8. The hood and bumper assembly of claim 7, wherein the bumper is disposed at a first bumper bracket surface and the one or more bracket slots are disposed at a second bumper bracket surface.

9. A bumper assembly for a hood of a vehicle, comprising:
   a bumper bracket secured to a fixed support of the vehicle; and
   a bumper disposed between the bumper bracket and the hood to absorb an impact force;
   wherein the bumper bracket is configured to release from the fixed support when the impact force exceeds a preselected threshold to dissipate the impact force;
   wherein the bumper bracket includes:
      one or more bracket slots defined in the bumper bracket; and
      a bracket sleeve disposed in each bracket slot of the one or more bracket slots; and
      a stud secured to the fixed support and extending through each bracket sleeve and is secured therein, wherein the bracket sleeve is configured to deform and release the stud when the impact force exceeds the preselected threshold.

10. The bumper assembly of claim 9, wherein:
   the bracket sleeve includes a U-shaped cross-section through which the stud extends; and
   the stud includes a complimentary rectangular portion that is installed into the U-shaped cross-section of the bracket sleeve.

11. The bumper assembly of claim 10, wherein the U-shaped cross-section of the bracket sleeve includes one or more deformable flanges configured to deform and release the stud when the impact force exceeds the preselected threshold.

12. The bumper assembly of claim 9, wherein the bracket sleeve is secured in the bracket slot via welding.

13. The bumper assembly of claim 9, further comprising a nut installed to a tip end of the stud, with the bracket sleeve disposed between the fixed support and the nut.

14. The bumper assembly of claim 9, wherein the bracket moves in a path defined by the one or more bracket slots upon release of the stud from the bracket sleeve.

15. The bumper assembly of claim 9, wherein the bumper bracket is L-shaped.

16. The bumper assembly of claim 15, wherein the bumper is disposed at a first bumper bracket surface and the one or more bracket slots are disposed at a second bumper bracket surface.

\* \* \* \* \*